United States Patent
Konishi et al.

(10) Patent No.: US 9,601,737 B2
(45) Date of Patent: Mar. 21, 2017

(54) LITHIUM-ION SECONDARY BATTERY SEPARATOR

(71) Applicant: JX Nippon Oil & Energy Corporation, Tokyo (JP)

(72) Inventors: Hiroaki Konishi, Tokyo (JP); Atsuo Omaru, Tokyo (JP); Yuji Tsuruta, Tokyo (JP)

(73) Assignee: JX NIPPON OIL & ENERGY CORPORATION (JP)

( * ) Notice: Subject to any disclaimer, the term of this patent is extended or adjusted under 35 U.S.C. 154(b) by 122 days.

(21) Appl. No.: 14/411,274

(22) PCT Filed: May 21, 2013

(86) PCT No.: PCT/JP2013/064055
§ 371 (c)(1),
(2) Date: Dec. 24, 2014

(87) PCT Pub. No.: WO2014/002648
PCT Pub. Date: Jan. 3, 2014

(65) Prior Publication Data
US 2015/0255768 A1  Sep. 10, 2015

(30) Foreign Application Priority Data
Jun. 29, 2012 (JP) .................. 2012-147186

(51) Int. Cl.
| | |
|---|---|
| *H01M 2/14* | (2006.01) |
| *H01M 2/16* | (2006.01) |
| *H01M 2/18* | (2006.01) |
| *H01M 6/12* | (2006.01) |
| *H01M 6/46* | (2006.01) |
| *D04H 1/4382* | (2012.01) |
| *H01M 10/0525* | (2010.01) |
| *D01F 8/06* | (2006.01) |

(52) U.S. Cl.
CPC .......... *H01M 2/162* (2013.01); *D04H 1/4382* (2013.01); *H01M 2/145* (2013.01); *H01M 2/1686* (2013.01); *D01F 8/06* (2013.01); *H01M 10/0525* (2013.01)

(58) Field of Classification Search
CPC ................................ H01M 2/162; H01M 2/16
See application file for complete search history.

(56) References Cited

U.S. PATENT DOCUMENTS

| | | | | |
|---|---|---|---|---|
| 2002/0045091 | A1* | 4/2002 | Kamei ............... | B32B 5/00 429/62 |
| 2002/0160259 | A1* | 10/2002 | Kinn ................... | B01D 39/163 429/144 |
| 2006/0194100 | A1* | 8/2006 | Tanaka .................. | D04H 1/48 429/142 |

FOREIGN PATENT DOCUMENTS

| | | |
|---|---|---|
| JP | H03-105851 A | 5/1991 |
| JP | 2003-123728 A | 4/2003 |
| JP | 2004-087335 A | 3/2004 |
| JP | 2006-092829 A | 4/2006 |

OTHER PUBLICATIONS

Int'l Search Report issued on Jul. 2, 2013 in Int'l Application No. PCT/JP2013/064055.

* cited by examiner

*Primary Examiner* — Patrick Ryan
*Assistant Examiner* — Julian Anthony
(74) *Attorney, Agent, or Firm* — Adams & Wilks

(57) ABSTRACT

A lithium-ion secondary battery separator resolves defects of a non-woven fabric separator which is not suitable for use in such a battery. The separator is thin and does not short-circuit and has excellent electrolyte retainability and rate characteristics. The separator includes a composite of a non-woven fabric having a basis weight of 2 to 20 $g/m^2$ formed from fibers of a thermoplastic material having an average fiber diameter of 5 to 40 μm and ultra-microfibers having an average fiber diameter of 1 μm or less in an amount of ⅓ to 3 times the mass of the non-woven fabric. The composite has a thickness of 10 to 40 μm after heat-pressing treatment under conditions that the non-woven fabric has a glossiness (JIS Z 8741) measured at 60° in the range of 3 to 30 and a thickness of 10 to 40.

17 Claims, 1 Drawing Sheet

Ratio of short circuit % /
First discharge capacity
mAh/g

60°C JIS Glossiness

Ratio of short circuit % /
First discharge capacity
mAh/g

60°C JIS Glossiness

LITHIUM-ION SECONDARY BATTERY SEPARATOR

CROSS-REFERENCE TO RELATED APPLICATION

This application is a Section 371 of International Application No. PCT/JP2013/064055, filed May 21, 2013, which was published in the Japanese language on Jan. 3, 2014, under International Publication No. WO 2014/002648 A1, and the disclosure of which is incorporated herein by reference.

TECHNICAL FIELD

The present invention relates to separators that are excellent in electrolyte retainability, rate characteristics, and safety and can lower the internal resistance of an electrochemical device and extend the working life thereof for lithium-ion secondary batteries.

BACKGROUND ART

The most important property of the separator used for various batteries is electrolyte retainability. If the separator is low in electrolyte retainability, it causes problems that it increases the internal resistance of the electrochemical device, resulting in capacity decrease, voltage down and short working life thereof.

For example, Japanese Patent Application Laid-Open Publication No. 3-105851 (Patent Literature 1) discloses, "A separator for a battery such as a lithium primary or secondary battery, which separator is a microporous membrane having a weight-average molecular weight/number average molecular weight of 10 to 300, and having a thickness of 0.1 to 25 µm, a porosity of 40 to 95%, an average through-bore diameter of 0.001 to 0.1 µm, a width of 10 mm and a rupture strength of 0.5 kg or more, formed of a polyethylene composition containing 1 percent by mass or more of an ultra-high molecular weight polyethylene having a weight-average molecular weight of $7 \times 10^5$ or greater".

However, this type of separator has an extremely small pore size that is on the order of submicron or smaller and thus when the viscosity of an electrolyte is high, has had a problem that the electrolyte is unlikely to permeate into the separator and the efficiency of the battery assembly becomes poor. Furthermore, since the separator has the fine pores formed linearly in the thickness direction and thus is rather poor in electrolyte retainability, the expansion and contraction of the electrode progresses accompanied with repeated charge and discharge causing a problem that the separator is compressed to push out the electrolyte retained therein and thus gradually reduced in capacity.

Recently, the use of a non-woven fabric having excellent liquid retainability and the like as a separator has been, therefore, proposed. The non-woven fabric has an advantage of excellent electrolyte retainability because it is formed of fibers each stacked relatively randomly in the thickness direction and thus the fine pores are not formed linearly.

However, if the conventional non-woven fabric is made too thin, it may cause a cathode and an anode to short-circuit. Whereas, the fabric is made thick, it can prevent a cathode and an anode from short-circuiting but has a drawback that the energy density is decreased. Therefore, the non-woven fabric is inadequate for the use in a lithium-ion secondary battery.

CITATION LIST

Patent Literature

Patent Literature 1: Japanese Patent Application Laid-Open Publication No. 3-105851

SUMMARY OF INVENTION

Technical Problem

The present invention has an object to provide a separator for a lithium-ion secondary battery that solves the problems of the conventional art, i.e., the non-woven fabric and is thin but does not short-circuit and is excellent in electrolyte retainability, rate characteristics and safety.

Solution to Problem

The present invention has been accomplished as the results of extensive studies to achieve the above object.

That is, the present invention relates to a lithium-ion secondary battery separator comprising a composite of a non-woven fabric having a basis weight of 2 to 20 g/m² formed from fibers of a thermoplastic material having an average fiber diameter of 5 to 40 µm and ultra-microfibers having an average fiber diameter of 1 µm or less in an amount of ⅕ to 3 times the mass of the non-woven fabric, the composite having a thickness of 10 to 40 µm after being subjected to a heat-pressing treatment carried out under such conditions that the non-woven fabric has a glossiness measured at 60° in accordance with JIS standard (JIS Z 8741) in the range of 3 to 30 and a thickness of 10 to 40 µm if only the non-woven fabric is subjected to the heat-pressing treatment.

Advantageous Effect of Invention

The lithium-ion secondary battery separator of the present invention is thin and safe because it is composed of ultra-microfibers and it does not short-circuit in spite of being high in porosity and also excellent in electrolyte retainability and rate characteristics.

DESCRIPTION OF EMBODIMENTS

Figure 1:
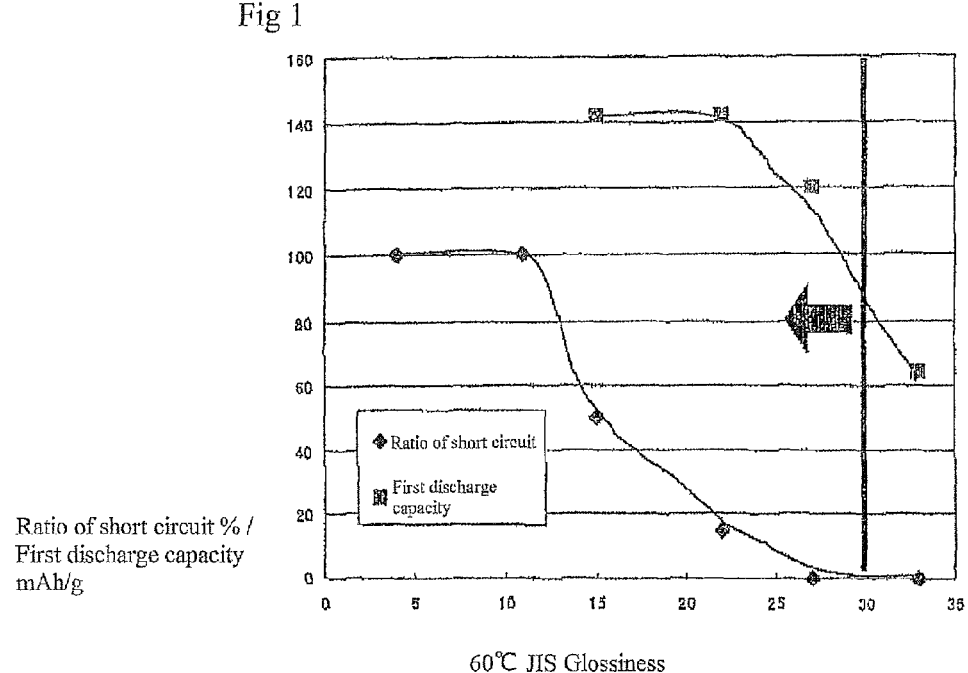
FIG. 1 A graph showing a relationship between the glossiness of a non-woven fabric alone without ultra-microfiber measured at 60° in accordance with JIS standard (JIS Z 8741) and the ratio of the short-circuit and first discharge capacity of the battery.

The present invention will be described in more detail below.

The lithium-ion secondary battery separator of the present invention comprises a composite of a non-woven fabric having a basis weight of 2 to 20 g/m² formed from fibers of a thermoplastic material having an average fiber diameter of 5 to 40 µm and ultra-microfibers having an average fiber diameter of 1 µm or less in an amount of ⅕ to 3 times the mass of the non-woven fabric, the composite having a thickness of 10 to 40 µm after being subjected to a heat-pressing treatment carried out under such conditions that the non-woven fabric has a glossiness measured at 60° in accordance with JIS standard (JIS Z 8741) in the range of 3 to 30 and a thickness of 10 to 40 µm if only the non-woven fabric is subjected to the heat-pressing treatment.

The non-woven fabric before being subjected to the heat-pressing treatment is formed from fibers of a thermoplastic material having an average fiber diameter of 5 to 40 µm. If the fiber diameter is greater than 40 µm, the resulting non-woven fabric becomes thick and thus is inadequate to be used in a separator. A non-woven fabric that is thick and large in volume would have a problem that it produces film portions when being heat-pressed and thus deteriorates the battery characteristics. Whilst, if the fiber diameter is narrower than 5 µm, the non-woven fabric would be deteriorated in strength.

The non-woven fabric used in the present invention has a basis weight of preferably 2 to 20 g/m$^2$, more preferably 4 to 10 g/m$^2$. If the basis weight is less than 2 g/m$^2$, the resulting non-woven fabric would become thin and cause a problem that it short-circuits the battery when used as a separator. If the basis weight exceeds 20 g/m$^2$, the non-woven fabric would be thick and inadequate for use in a separator.

No particular limitation is imposed on the fiber forming the non-woven fabric if it is formed from a thermoplastic material having an average fiber diameter of 5 to 40 µm. Examples include various thermoplastic materials that are polyolefins such as polyethylene, polypropylene and polystyrene, polyesters such as polyethylene terephthalate, polytrimethylene terephthalate, polybutylene terephthalate, polyethylene naphthalate and polybutylene naphthalate, polyamides, polyimides, polyacrylonitriles and polyvinyl alcohols. These may be copolymers. These may be used alone or in combination. The thermoplastic material has preferably a melting point that is equal to or lower than the melting point of the material constituting the ultra-microfiber used in the present invention. If the material constituting the ultra-microfiber has a lower melting point than the thermoplastic material, the microfiber would melt before the thermoplastic material melts. However, a thermoplastic material having a higher melting point can be also used if it is used in combination with a thermoplastic material having a lower melting point so that the thermoplastic material having a lower melting point becomes the main component.

In the present invention, polyolefins such as polyethylene (PE), polypropylene (PP) and the like are preferably used, and composite fibers such as core-in-sheath type composite fibers (core: PP, sheath: PE) of polyolefins are particularly preferably used. In a core-in-sheath type composite fiber, the fibers are easily fused to each other by a heat pressing treatment such as heat press or heat lamination so as to enhance the strength of the non-woven fabric. The core-in-sheath type composite fibers of polyolefins are preferably used in combination with various fibers formed from the above-exemplified thermoplastic materials other than polyolefins.

The composite fiber is not limited to the core-in-sheath type, and thus side-by-side type and segmented type composite fibers are also preferably used. Alternatively, a mixed fiber of components forming the composite fiber may be used. For example, a mixture of fibers of PP and fibers of PE used in a non-woven form can obtain an effect that is close to that obtained with the core (PP) and sheath (PE) type composite fiber.

The non-woven fabric may contain various other fibers in addition to the fibers of the above-exemplified thermoplastic materials. No particular limitation is imposed on the type of such various fibers, which may be, for example, cellulose or various fluorinated resins. When the non-woven fabric contains various other fibers, the weight ratio of the fibers of a thermoplastic material and the various other fibers is preferably from 60:40 to 100:0. If the weight ratio of the thermoplastic material is less than 60%, it causes difficulty in making the non-woven fabric thin upon a heat-pressing treatment.

In the present invention, the non-woven fabric is preferably formed from core-in-sheath type composite fibers containing a thermoplastic material as the sheath component or the core-in-sheath type composite fibers and other fibers of thermoplastic materials.

The porosity of the non-woven fabric can be arbitrarily adjusted with the type of fibers to be used or conditions for the heat-pressing treatment. The porosity is preferably from 30 to 80%, more preferably from 50 to 80%, more preferably from 60 to 80%.

A lithium-ion secondary battery separator which is thin and enhanced in safety because it is unlikely to cause short-circuit between the electrodes can be also produced by heat-pressing the non-woven fabric without being combined with ultra-microfibers having an average fiber diameter of 1 µm or less so that it has a glossiness at 60° measured in accordance with JIS standard (JIS Z 8741) of 15 to 30 and a thickness of 10 to 40 µm thereby also making it possible to produce. However, since as shown in FIG. 1, the non-woven fabric having a glossiness of 15 has a shorting rate of about 50 percent, it is highly likely to have relatively large holes and thus must be improved.

In the present invention, the above-described non-woven fabric is combined with ultra-microfibers having an average fiber diameter of 1 µm or less (hereinafter, simply referred to as "ultra-microfibers") to close such relatively large holes and as the result improve the resulting separator not to cause short-circuit. Furthermore, the present invention enables the ratio of short-circuit to be 0% by combining the non-woven fabric even if having a glossiness of 15 or lower and a ratio of short-circuit of 100% with the ultra-microfiber.

The ultra-microfibers used in the present invention may be produced by various methods such as Melt-Blown method, electrospinning and melt-electrospinning methods.

The material of the ultra-microfiber used in the present invention may be of any type if it can be microfined, such as various polyolefins, polyesters, polyvinyl alcohols, various fluororesins, polyimides, polyphenylene sulfides. These materials may be copolymers. Among these materials, those containing polypropylene as the main component are preferably used. The ultra-microfiber may be a continuous fiber or a short fiber if it can be fusion-fixed to the non-woven fabric by heat pressing. The ultra-microfiber may have a core-sheath structure.

When the non-woven fabric and the ultra-microfibers are combined, the ultra-microfibers may have been included in the non-woven fabric at the time of production thereof beforehand and then may be subjected to a heat pressing to make a single piece of non-woven fabric. Alternatively, the non-woven fabric and the ultra-microfibers that have been heat-treated or not been heat-treated may be laminated and integrated by heat pressing to have any of the configurations such as the ultra-microfibers/the non-woven fabric, the non-woven fabric/the ultra-microfibers/the non-woven fabric, and the ultra-microfibers/the non-woven fabric/the ultra-microfibers. When the non-woven fabric and the ultra-microfibers are laminated and integrated to be in the non-woven fabric/the ultra-microfibers/the non-woven fabric configuration, the thickness of the non-woven fabrics is increased, and either of the ultra-microfibers/the non-woven fabric or the ultra-microfibers/the non-woven fabric/the ultra-microfibers is, therefore, more desirous.

When the non-woven fabric and the ultra-microfibers are combined, the ratio of the ultra-microfibers to be used to the non-woven fabric cannot be necessarily determined because it varies depending on the thickness, basis weight or porosity of the non-woven fabric, but the ultra-microfibers are used such that it is combined with the non-woven fabric and heat-pressed to have a thickness falling within the range of 10 to 40 μm, and used in an amount of ⅕ to 3 times, preferably ½ to 2 times the mass of the non-woven fabric. If the amount of the ultra-microfibers to the non-woven fabric mass is too less, the ratio of short-circuit would not be improved. If too many ultra-microfibers are used, they affect the basis weight or thickness of the composite non-woven fabric.

In the present invention, the conditions for heat-pressing a non-woven fabric having a basis weight of 2 to 20 g/m² formed from fibers of a thermoplastic material having an average fiber diameter of 5 to 40 μm so that the non-woven fabric has a glossiness at 60° measured in accordance with JIS standard (JIS Z 8741) of 3 to 30 and a thickness of 10 to 40 μm are the same as those for heat-pressing a composite of the non-woven fabric and the ultra-microfibers described later.

No particular limitation is imposed on the type of method for heat-pressing the composite product if the method is for applying pressure to the product to be thinned while heat is applied to the product to soften the fibers and melt a part thereof. Examples of the method include heat press, heat lamination and the like.

FIG. 1 shows a relationship between the glossiness at 60° measured in accordance with JIS standard of a non-woven fabric alone containing no ultra-microfiber and the ratio of short-circuit and first discharge capacity of the battery. As shown in FIG. 1, it is confirmed that when the 60° JIS standard glossiness is from 15 to 23, the first discharge capacity is kept at a high level but as the glossiness rise above 23, the initial discharge capacity is lowered. This is because the non-woven fabric has a larger film portion as the whole due to an increase in the number of melting fibers by a higher heat treatment. The number of the film portion and the glossiness are in a proportional relation. The film portion does not permeate ions and thus lowers the first discharge capacity.

While, from the viewpoint of the ratio of short-circuit, when the 60° JIS standard glossiness is 27 or higher, the ratio of short-circuit is 0% but as the glossiness is lower than 27, the ratio of short-circuit increases, and when the glossiness becomes lower than 15, the ratio of short-circuit significantly increases.

In the present invention, even for a non-woven fabric whose ratio of short-circuit would be more than 50%, it is combined with polyolefin ultra-microfibers having an average fiber diameter of 1 μm or less and heat-pressed, making it possible to produce a lithium-ion secondary battery separator which is thin and enhanced in safety because it is unlikely to cause short-circuit between the electrodes.

Figure 2:
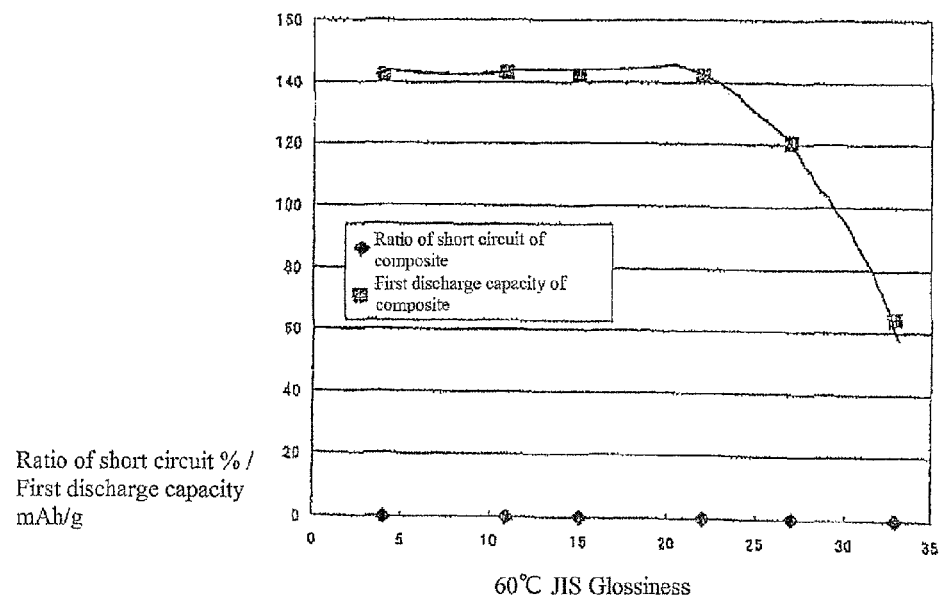
FIG. 2 A graph showing a relationship between the glossiness of a non-woven fabric alone without ultra-microfiber measured at 60° in accordance with JIS standard (JIS Z 8741), the ratio of short-circuit of a composite of a non-woven fabric and ultra-microfibers and the first charge and discharge capacity of the battery.

FIG. 2 shows a relationship between the 60° JIS standard glossiness of a non-woven fabric containing no ultra-microfiber and the first charge and discharge capacity and ratio of short-circuit of the combination of the ultra-microfibers and the non-woven fabric. The reason for using the glossiness of the non-woven fabric alone containing no ultra-microfiber is that as described above, when ultra-microfibers are contained, they scatter light and thus the glossiness of the original non-woven fabric fiber cannot be measured. The first discharge capacity of a composite non-woven fabric containing ultra-microfibers is determined by the glossiness of the non-woven fabric before being combined. The ratio of short-circuit of a non-woven fabric with a glossiness of 15, whose shorting rate was 50% can be 0% by being combined with ultra-microfibers. By being combined with ultra-microfibers, the ratio of short-circuit of a non-woven fabric having a glossiness of 10 or lower, whose ratio of short-circuit was 100% can also be 0% and can be used as a separator.

Therefore, in the case where the ultra-microfibers and the non-woven fabric are combined, the range of the most appropriate glossiness is not affected by ratio of short-circuit and defined with the first charge and discharge capacity. Although a non-woven fabric having a glossiness of 30 can be used, most preferred glossiness range is a range between 20 or lower which does not reduce the first charge and discharge capacity and 3 or higher in terms of strength.

In the present invention, the heat pressing treatment of the composite product of the non-woven fabric and the ultra-microfibers is carried out so that if the non-woven fabric alone is heat-pressed, the 60° JIS standard (JIS Z 8741) glossiness is in the range of 3 to 30, but the glossiness is importantly made 30 or lower, preferably 25 or lower, more preferably 20 or lower. With regard to the lower limit glossiness, the glossiness which is low even after being heat-pressed indicates that the fibers do not fuse by heat-pressing and thus the non-woven fabric has a problem in strength. Therefore, the glossiness is desirously 3 or higher. Herein, the glossiness is defined as a glossiness of a non-woven fabric alone containing no ultra-microfiber, and this is because when the glossiness of a non-woven fabric containing ultra-microfibers is measured, the ultra-microfibers scatter light and thus the glossiness of the original non-woven fabric fiber (influences to the first charge and discharge characteristics) cannot be measured.

The glossiness can be arbitrarily adjusted by the temperature and pressure at which the heat pressing is carried out. Generally, the glossiness is adjusted by lowering the pressure when the heat pressing temperature is raised and increasing the pressure when the heat pressing temperature is lowered. For example, when the thermoplastic material is low in melting point, the heat pressing temperature is lowered to obtain a predetermined glossiness.

In the present invention, the heat pressing temperature is arbitrarily determined depending on the type of thermoplastic material constituting the non-woven fabric but is usually within the range of 100 to 300° C., and when the thermoplastic material is a polyolefin, preferably within the range of 100 to 150° C. When a composite fiber is used, preferred is such a temperature range that only a component which should be heat-fused melts and the other components does not melt. The pressure is from 0.5 to 3 MPa, preferably 1 to 1.5 MPa and importantly within such a range that upon heat-pressing the thickness of the non-woven fabric does not deviate from the range of 10 to 40 μm. Thereupon, the difference in melting point between the non-woven fabric and the ultra-microfibers should be considered so that the ultra-microfibers are not melted.

The thickness of the composite non-woven fabric after the heat-pressing treatment, used as the separator of the present invention varies depending on fiber diameter or thickness of the composite non-woven fabric before the heat-pressing treatment or the conditions therefor but is necessarily 40 μm or less. If the composite non-woven fabric has a thickness of greater than 40 μm, it is too thick to be used as the separator. The thickness is preferably 30 μm or less, more preferably 25 μm or less. While, when the composite after the heat-pressing treatment is too thin, it would arise a problem in strength or handleability and thus the thickness is necessarily 10 μm or greater, preferably 15 μm or greater.

The porosity of the composite non-woven fabric after the heat-pressing treatment can be arbitrarily adjusted with the type of fiber to be used or heat-pressing conditions but is preferably from 30 to 80%, more preferably from 50 to 80%, more preferably from 60 to 80%. A separator with a higher porosity provides a battery with better characteristics.

The composite non-woven fabric of the present invention produced as described above is enhanced in laminate strength and small in diameter of pores between the fibers because the fibers partially fused to one another. Since the lithium-ion secondary battery separator formed of the composite non-woven fabric of the present invention has smaller pore diameters between the fibers by combining the non-woven fabric and the ultra-microfibers, it causes difficulty in short-circuit between the electrodes in spite of the smaller thickness and high porosity and thus can enhance the safety.

Next, description will be given to a lithium-ion secondary battery comprising the separator of the present invention.

The lithium-ion secondary battery comprises an anode, a cathode, a separator, a solvent and a nonaqueous electrolyte. These components may be those that can be usually used in a lithium-ion secondary battery except for using the separator of the present invention as a separator.

The cathode and the anode each comprise an active material, a binder polymer binding the active material and a collector, and a conductive agent may be added for the purpose of enhancing the conductivity of the electrodes.

Examples of the cathode active material include various lithium-containing transition metal oxides but are not limited thereto. Any active material used in a so-called 4 V class lithium-ion secondary battery may be used. Examples of the active material include those mainly composed of a lithium-containing transition metal oxide. Examples of the lithium-containing transition metal oxide include $LiCoO_2$, $LiNiO_2$, $LiNiCoO_2$ and $LiMn_2O_4$.

The anode active material may be any of those mainly composed of a carbon material that can dope and undope lithium ions. Examples of the carbon material include those produced by sintering organic polymers such as polyacrylonitrile, phenol resin, phenol novolak resin, cellulose, artificial graphite and natural graphite.

The cathode preferably contains a conductive agent. Artificial graphite, carbon black (acetylene black) and nickel powder are suitably used as such a conductive agent. In contrast, the anode does not need a conductive agent but may contain the same.

The binder polymer may be polyvinylidene fluoride (PVdF), a PVdF-based copolymer resin such as copolymers of vinylidene fluoride, hexafluoropropylene (HFP) or perfluoromethyl vinyl ether (PFMV) and tetrafluoroethylene, polytetrafluoroethylene, fluororesins such as fluoro-rubber, a hydrocarbon-based polymer such as styrene-butadiene copolymers and styrene-acrylonitrile copolymers, carboxyl-methyl cellulose, or a polyimide resin but are not limited thereto. These polymers may be used alone or in combination.

As the collector, materials with excellent oxidation resistivity are used for the cathode and materials with excellent reduction resistivity are used for the anode. Specifically, examples of the cathode collector include aluminum, stainless steel and the like and examples of the anode collector include copper, nickel, stainless steel and the like. The collector may be of a foil- or mesh-like shape. In particular, the cathode collector is preferably aluminum foil and the anode collector is preferably copper foil.

The blend ratio of the active material, the binder polymer and the conductive agent is preferably 3 to 30 parts by mass of the binder polymer on the basis of 100 parts by mass of the active material and 10 parts by mass or less of the conductive agent if contained.

The nonaqueous electrolyte used in the lithium-ion secondary battery may be an electrolyte produced by dissolving a lithium salt in a solvent. No particular limitation is imposed on the solvent if it is a polar organic solvent having 10 or fewer carbon atoms that is generally used in a lithium-ion secondary battery. Examples of the solvent include propylene carbonate, ethylene carbonate, butylene carbonate, diethyl carbonate, methyethyl carbonate, 1,2-dimethoxyethane, 1,2-diethoxyethane, γ-butyrolactone, sulfolane, acetonitrile and mixtures thereof.

Examples of the lithium salt dissolved in the solvent include lithium perchlorate, lithium hexafluorophosphate, lithium tetrafluoroborate, lithium hexafluoroarsenate, lithium trifluoro sulphate, lithium perfluoromethylsulfonylimide and lithium perfluoroethylsulfonylimide. The compounds may be mixed. The concentration of the lithium salt dissolved in the solvent is preferably within the range of 0.2 to 2 M/L.

No particular limitation is imposed on the method for producing a lithium-ion battery comprising the separator of the present invention. Any conventional method for producing a lithium-ion secondary battery may be employed.

Specifically, a method is generally used, wherein an assembly of a cathode and an anode joined together via the separator of the present invention is put in an exterior package and an nonaqueous electrolyte is injected therein, followed by sealing the injection port. Injection of the nonaqueous electrolyte is suitably carried out using a vacuum injection method but is not limited thereto. Alternatively, the assembly may be impregnated with the nonaqueous electrolyte before being put in the exterior package.

For a film-armored battery with an exterior that is a pack of an aluminum laminated film, the electrode and the separator are preferably bonded to each other to be integrated.

Bonding of the separator and the electrode is mainly carried out with a thermal compression bond method, which may be carried out in a dry state where the nonaqueous electrolyte solution is not contained or a wet state where the nonaqueous electrolyte solution is contained. Alternatively, in the case where the separator and the electrode are bonded well, the battery can be produced without through the thermal compression bond process.

No particular limitation is imposed on the shape of the lithium-ion secondary battery thus produced, which may be of a flattened or button shape such as a cylindrical or square shape.

The exterior may be a steel can, an aluminum can or an aluminum laminated film but is not limited thereto.

EXAMPLES

The present invention will be described in more detail with the following examples but is not limited thereto. Each value in the examples was determined with the following method.

(1) Average Diameter of Fibers:

Photos of the surface of a fiber assembly thus produced was taken with an electron scanning microscope (SU-1500 manufactured by Hitachi, Ltd.) (7000-fold magnification). Randomly, 10 photos from the photos taken were selected to measure the diameters of all the fibers in the 10 photos and calculate the average of the diameters thereby obtaining the average diameter of the fibers.

(2) Gloss Meter:

The 60° glossiness of a non-woven fabric was measured with a gloss meter (PG-IIM manufactured by NIPPON DENSHOKU INDUSTRIES CO. LTD.). The measurement was carried out randomly at 5 sites in each of the TD direction and MD direction of the non-woven fabric. The average of the measurement results at a total of the 10 sites was defined as the glossiness of the non-woven fabric.

[Production of Cathode]

A paste of cathode material was prepared by mixing homogeneously 25.5 g of lithium cobaltate ($LiCoO_2$) powder, 1.5 g of acetylene black, 3 g of PVdF and 27 g of N-methyl-pyrrolidone (NMP). The resulting paste was applied on an aluminum foil having a thickness of 20 μm and dried. The foil was punched out to be 15 mm in diameter and pressed thereby producing a cathode.

[Production of Anode]

A mixture of 15 g of artificial graphite, 0.16 g of acetylene black, 0.8 g of PVdF and 11.2 g of N-methyl-pyrrolidone (NMP) was applied on a copper foil having a thickness of 20 μm and dried. The foil was punched out to be 15 mm in diameter and then pressed thereby producing an anode.

[Preparation of Nonaqueous Electrolyte]

The electrolyte was prepared by adding and dissolving lithium hexafluorophosphate ($LiPF_6$) in a mix solvent of ethylene carbonate (EC) and dimethyl carbonate (DMC) at a volume ratio of 3:7 so that the electrolyte concentration was 1.2 M/L.

Example 1

Production of Laminated Separator A1

Core-in-sheath type fibers (core: polypropylene, sheath: polyethylene) having an average fiber diameter of 15 μm and cellulose fibers having an average fiber diameter of 5 μm in a weight ratio of 90:10 were paper-made by a wet paper-making method thereby producing Non-woven Fabric a having a thickness of 20 μm and a basis weight of 4 g/m². Ultra-microfibers of polypropylene having an average fiber diameter of 1 μm in an amount equal to the mass of Non-woven Fabric a was laminated thereon, followed by heat-pressing (heat lamination method) at 135° C. and 1 MPa thereby producing Laminated Separator A1. Separator A1 had a thickness of 22 μm and a basis weight of 8 g/m². When Non-woven Fabric a alone was heat-pressed at 135° C. and 1 MPa, the 60° JIS standard (JIS Z 8741) glossiness thereof was 4.

A lithium-ion secondary battery comprising Separator A1 had a ratio of short-circuit of 0% and a first discharge capacity of 140 mAh/g that was extremely high.

Example 2

Production of Laminated Separator A2

Ultra-microfibers of polypropylene having an average fiber diameter of 1 μm in an amount of ½ time the mass of Non-woven Fabric a was laminated thereon, followed by heat-pressing (heat lamination method) at 135° C. and 1 MPa thereby producing Laminated Separator A2. Separator A2 had a thickness of 22 μm and a basis weight of 6 g/m².

A lithium-ion secondary battery comprising Separator A2 had a ratio of short-circuit of 0% and a first discharge capacity of 140 mAh/g which was extremely high.

Example 3

Production of Laminated Separator B1

Core-in-sheath type fibers (core: polypropylene, sheath: polyethylene) having an average fiber diameter of 15 μm and cellulose fibers having an average fiber diameter of 5 μm in a weight ratio of 85:15 were paper-made by a wet paper-making method thereby producing Non-woven Fabric b having a thickness of 30 μm and a basis weight of 6 g/m². Ultra-microfibers of polypropylene having an average fiber diameter of 1 μm in an amount of ⅓ time the mass of Non-woven Fabric b were laminated thereon, followed by heat-pressing (heat lamination method) at 135° C. and 1.5 MPa thereby producing Laminated Separator B1. Separator B1 had a thickness of 24 μm and a basis weight of 8 g/m². When Non-woven Fabric b alone was heat-pressed at 135° C. and 1 MPa, the 60° JIS standard (JIS Z 8741) glossiness thereof was 11.

A lithium-ion secondary battery comprising Separator B1 had a ratio of short-circuit of 0% and a first discharge capacity of 140 mAh/g which was extremely high.

Example 4

Production of Laminated Separator C1

Core-in-sheath type fibers (core: polypropylene, sheath: polyethylene) having an average fiber diameter of 15 μm and cellulose fibers having an average fiber diameter of 5 μm in a weight ratio of 85:15 were paper-made by a wet paper-making method thereby producing Non-woven Fabric c having a film thickness of 34 μm and a basis weight of 8 g/m². Ultra-microfibers of polypropylene having an average fiber diameter of 1 μm in an amount of ⅓ time the mass of Non-woven Fabric c were laminated thereon, followed by heat pressing (heat lamination method) at 135° C. and 1.5 MPa thereby producing Laminated Separator C1. Separator C1 had a thickness of 25 μm and a basis weight of 11 g/m². When Non-woven Fabric c alone was heat-pressed at 135° C. and 1.5 MPa, the 60° JIS standard (JIS Z 8741) glossiness was 15.

A lithium-ion secondary battery comprising separator C1 had a ratio of short-circuit of 0% and an initial discharge capacity of 140 mAh/g which was extremely high.

Comparative Example 1

Production of Single Layer Separator a1

Non-woven Fabric a was heat-pressed at 135° C. and 1 MPa (heat lamination method) thereby producing Single Layer Separator a1 having a thickness of 18 μm, a basis weight of 4 g/m² and a 60° JIS standard (JIS Z 8741) glossiness of 4.

A lithium-ion secondary battery comprising Separator a1 had a ratio of short-circuit of 100%, and Separator a1 was inadequate as a separator.

Comparative Example 2

Production of Single Layer Separator b1

Non-woven Fabric b was heat-pressed at 135° C. and 1.5 MPa (heat lamination method) thereby producing Single Layer Separator b1 having a thickness of 22 μm, a basis weight of 6 g/m² and a 60° JIS standard (JIS Z 8741) glossiness of 11.

A lithium-ion secondary battery comprising Separator b1 had a ratio of short-circuit of 100% and thus Separator b1 was inadequate as a separator.

Comparative Example 3

Production of Single Layer Separator c1

Non-woven Fabric c was heat-pressed at 135° C. and 1.5 MPa (heat lamination method) thereby producing Single Layer Separator c1 having a thickness of 23 μm, a basis weight of 8 g/m² and a 60° JIS standard (JIS Z 8741) glossiness of 15.

A lithium-ion secondary battery comprising separator c1 had a ratio of short-circuit of 50%.

Comparative Example 4

Production of Laminated Separator A3

Ultra-microfibers of polypropylene having an average fiber diameter of 1 μm in an amount of ⅙ time the mass of Non-woven Fabric a were laminated thereon, followed by heat pressing (heat lamination method) at 135° C. and 1 MPa thereby producing Laminated Separator A3. Separator A3 had a thickness of 22 μm and a basis weight of 5 g/m².

A lithium-ion secondary battery comprising Separator A3 had a ratio of short-circuit of 100%, and thus Separator A3 was inadequate as a separator.

[Production of Battery, Battery Test]

Non-woven fabrics having a different 60° JIS standard (JIS Z 8741) glossiness from each other after being heat-pressed were used as separators to produce 2032 coin type batteries (each N=5). The batteries were evaluated by carrying out by constant current (0.1C)/constant-voltage charge at a cut-off voltage of 4.15 V. FIG. 1 shows a relationship between the 60° JIS standard (JIS Z 8741) glossiness of a non-woven fabric alone containing no ultra-microfiber and the ratio of short-circuit and first discharge capacity of the battery containing the non-woven fabric. FIG. 2 shows the relationship between the 60° JIS standard (JIS Z 8741) glossiness of a non-woven fabric alone containing no ultra-microfiber and the ratio of short-circuit of a composite non-woven fabric of and the first charge and discharge capacity of a battery.

The invention claimed is:

1. A lithium-ion secondary battery separator comprising a composite of a non-woven fabric having a basis weight of 2 to 20 g/m² formed from fibers of a thermoplastic material having an average fiber diameter of 5 to 40 μm and ultra-microfibers having an average fiber diameter of 1 μm or less in an amount of ⅓ to 3 times the mass of the non-woven fabric, the composite having a thickness of 10 to 40 μm after being subjected to a heat-pressing treatment carried out under such conditions that the non-woven fabric has a glossiness measured at 60° in accordance with JIS standard (JIS Z 8741) in the range of 3 to 30 and a thickness of 10 to 40 μm if only the non-woven fabric is subjected to the heat-pressing treatment.

2. The lithium-ion secondary battery separator according to claim 1, wherein the thermoplastic material is at least one type of thermoplastic material selected from the group consisting of polyolefins, polyesters, polyamides, polyimides, polyacrylonitriles and polyvinyl alcohols.

3. The lithium-ion secondary battery separator according to claim 2, wherein the non-woven fabric is formed from core-in-sheath type composite fibers containing a thermoplastic material as the sheath component or the core-in-sheath type composite fibers and other fibers of thermoplastic materials.

4. The lithium-ion secondary battery separator according to claim 2, wherein the heat pressing treatment is carried out at a temperature of 100 to 300° C. and a pressure of 0.5 to 3 MPa.

5. The lithium-ion secondary battery separator according to claim 1, wherein the non-woven fabric is formed from core-in-sheath type composite fibers containing a thermoplastic material as the sheath component or the core-in-sheath type composite fibers and other fibers of thermoplastic materials.

6. The lithium-ion secondary battery separator according to claim 5, wherein the heat pressing treatment is carried out at a temperature of 100 to 300° C. and a pressure of 0.5 to 3 MPa.

7. The lithium-ion secondary battery separator according to claim 5, wherein the core component and sheath component of the core-in-sheath type composite fibers are polypropylene and polyethylene, respectively.

8. The lithium-ion secondary battery separator according to claim 7, wherein the heat pressing treatment is carried out at a temperature of 100 to 300° C. and a pressure of 0.5 to 3 MPa.

9. The lithium-ion secondary battery separator according to claim 1, wherein the heat pressing treatment is carried out at a temperature of 100 to 300° C. and a pressure of 0.5 to 3 MPa.

10. The lithium-ion secondary battery separator according to claim 1, wherein the composite is laminated and integrated.

11. The lithium-ion secondary battery separator according to claim 1, wherein the composite is the non-woven fabric and the ultra-microfibers in an amount of ½ to 3 times the mass of the non-woven fabric.

12. A lithium-ion secondary battery separator comprising a heat-pressed composite of a non-woven fabric combined with ultra-microfibers, the heat-pressed composite having a thickness of 10 to 45 μm, the non-woven fabric having a basis weight of 2 to 20 g/m² and being formed from fibers of a thermoplastic material having an average fiber diameter of 5 to 40 μm and a glossiness measured at 60° in accordance with JIS standard (JIS Z 8741) in the range of 3 to 30, the ultra-microfibers having an average fiber diameter of 1 μm or less and being present in an amount of ⅓ to 3 times the mass of the non-woven fabric.

13. The lithium-ion secondary battery separator according to claim 12, wherein the thermoplastic material is at least one type of thermoplastic material selected from the group consisting of polyolefins, polyesters, polyamides, polyimides, polyacrylonitriles and polyvinyl alcohols.

14. The lithium-ion secondary battery separator according to claim 12, wherein the non-woven fabric is formed from core-in-sheath type composite fibers containing a thermoplastic material as the sheath component or the core-in-sheath type composite fibers and other fibers of thermoplastic materials.

15. The lithium-ion secondary battery separator according to claim 14, wherein the core component and sheath component of the core-in-sheath type composite fibers are polypropylene and polyethylene, respectively.

16. The lithium-ion secondary battery separator according to claim 12, wherein the composite is a laminated and integrated composite.

17. The lithium-ion secondary battery separator according to claim 12, wherein the ultra-microfibers are present in an amount of ½ to 3 times the mass of the non-woven fabric.

* * * * *